US011505313B2

(12) United States Patent
Bernard et al.

(10) Patent No.: US 11,505,313 B2
(45) Date of Patent: Nov. 22, 2022

(54) CONVERSION ACTUATION SYSTEMS AND METHODS FOR TILTROTOR AIRCRAFT

(71) Applicant: Bell Textron Inc., Fort Worth, TX (US)

(72) Inventors: Guy Bernard, Kirkland (CA); Randy Aloysius, Baie d'urfe (CA)

(73) Assignee: Textron Innovations Inc., Providence, RI (US)

( * ) Notice: Subject to any disclaimer, the term of this patent is extended or adjusted under 35 U.S.C. 154(b) by 493 days.

(21) Appl. No.: 16/666,610

(22) Filed: Oct. 29, 2019

(65) Prior Publication Data
US 2021/0122463 A1     Apr. 29, 2021

(51) Int. Cl.
*B64C 27/52* (2006.01)
*F16H 25/20* (2006.01)
*B64C 29/00* (2006.01)
*B64C 27/20* (2006.01)

(52) U.S. Cl.
CPC .......... *B64C 27/52* (2013.01); *B64C 29/0033* (2013.01); *F16H 25/2015* (2013.01); *F16H 25/2021* (2013.01); *B64C 27/20* (2013.01); *F16H 2025/2075* (2013.01)

(58) Field of Classification Search
CPC ..... B64C 29/0033; B64C 27/26; B64C 27/28; B64C 27/52
See application file for complete search history.

(56) References Cited

U.S. PATENT DOCUMENTS

| 3,028,123 | A | * | 4/1962 | Sorenson | B64C 29/0033 244/48 |
| 3,766,790 | A | * | 10/1973 | Weir | B64C 29/0033 475/8 |
| 5,092,539 | A | * | 3/1992 | Caero | B64C 27/28 254/102 |
| 6,109,415 | A | * | 8/2000 | Morgan | B64C 13/28 192/223.1 |
| 6,220,545 | B1 | * | 4/2001 | Fenny | B64C 29/0033 244/99.2 |
| 6,247,667 | B1 | | 6/2001 | Fenny et al. | |
| 6,260,793 | B1 | * | 7/2001 | Balayn | B64C 39/029 244/66 |
| 6,276,633 | B1 | * | 8/2001 | Balayn | B64C 29/0033 244/56 |

(Continued)

OTHER PUBLICATIONS

Canadian Exam Report from related Canadian Patent Application No. 3,060,742 dated Feb. 17, 2021, 5 pages.

(Continued)

*Primary Examiner* — Joshua J Michener
*Assistant Examiner* — Arfan Y. Sinaki
(74) *Attorney, Agent, or Firm* — Lightfoot & Alford PLLC

(57) ABSTRACT

A method of displacing rotors of an aircraft between a hover mode and an aircraft mode includes rotating a spindle drivingly connected to the rotors about a spindle axis to displace the rotors between the hover and aircraft modes until a component displaceable with the spindle abuts against a downstop of the aircraft and applies a load against the downstop. The method includes passively maintaining the component against the downstop to maintain the load applied against the downstop. An aircraft is also disclosed.

8 Claims, 5 Drawing Sheets

(56) References Cited

U.S. PATENT DOCUMENTS

| | | | | |
|---|---|---|---|---|
| 6,328,256 | B1* | 12/2001 | Ryan | B64C 27/322 |
| | | | | 403/150 |
| 7,871,033 | B2 | 1/2011 | Karem et al. | |
| 7,913,947 | B2* | 3/2011 | Haynes | B64C 29/0033 |
| | | | | 244/12.4 |
| 10,913,542 | B2* | 2/2021 | King | F16H 57/025 |
| 10,994,839 | B2* | 5/2021 | Kooiman | B64C 29/0033 |

OTHER PUBLICATIONS

Canadian Exam Report in related Canadian Patent Application No. 3,060,742 dated Oct. 14, 2021, 4 pages.

* cited by examiner

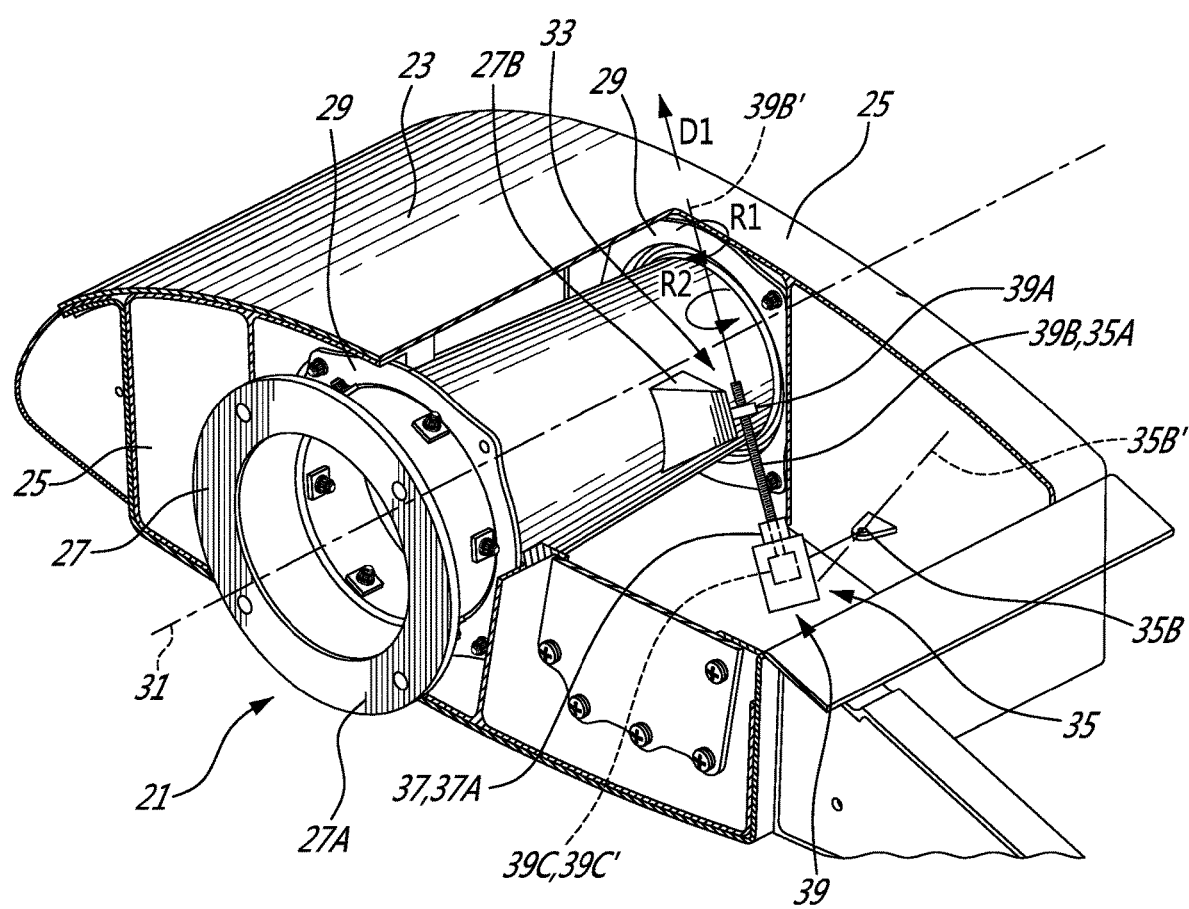

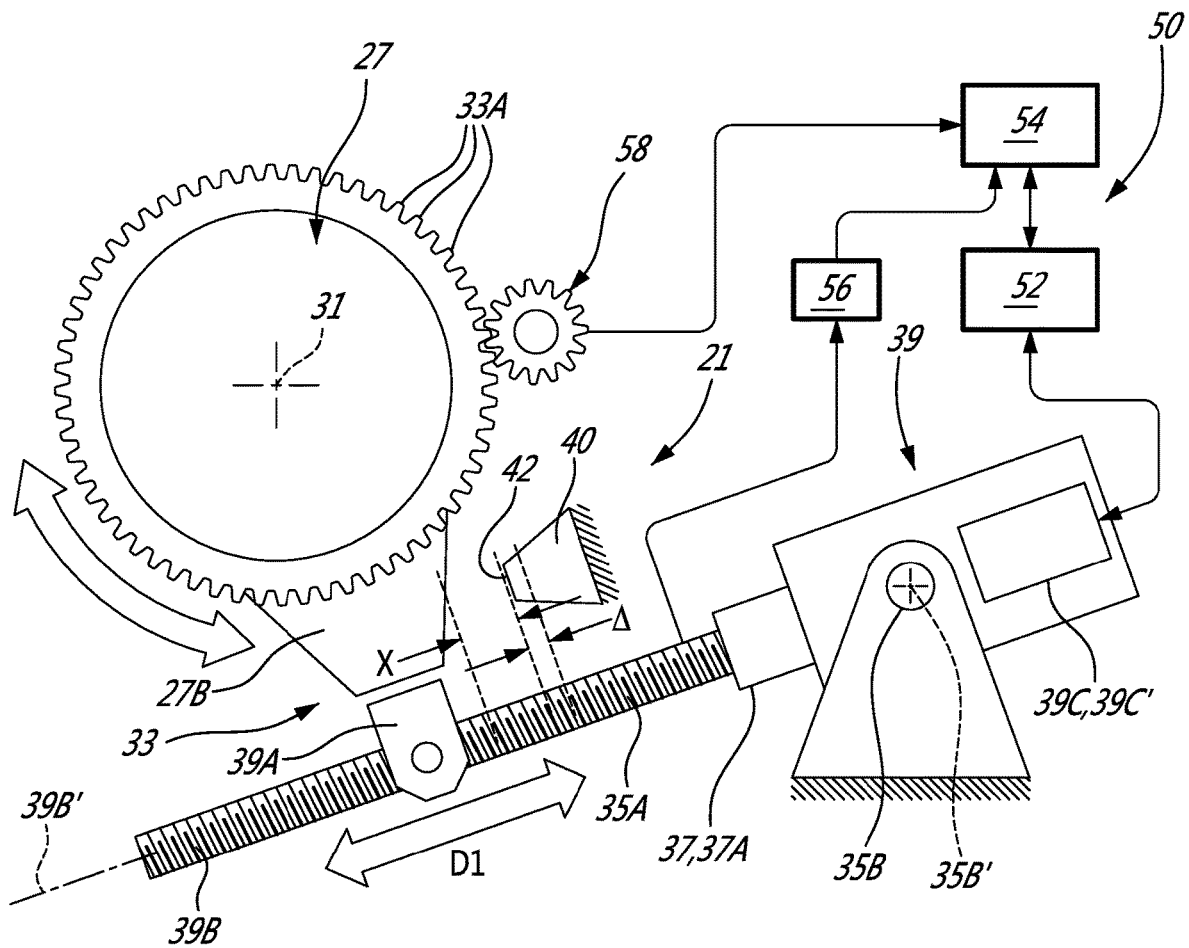

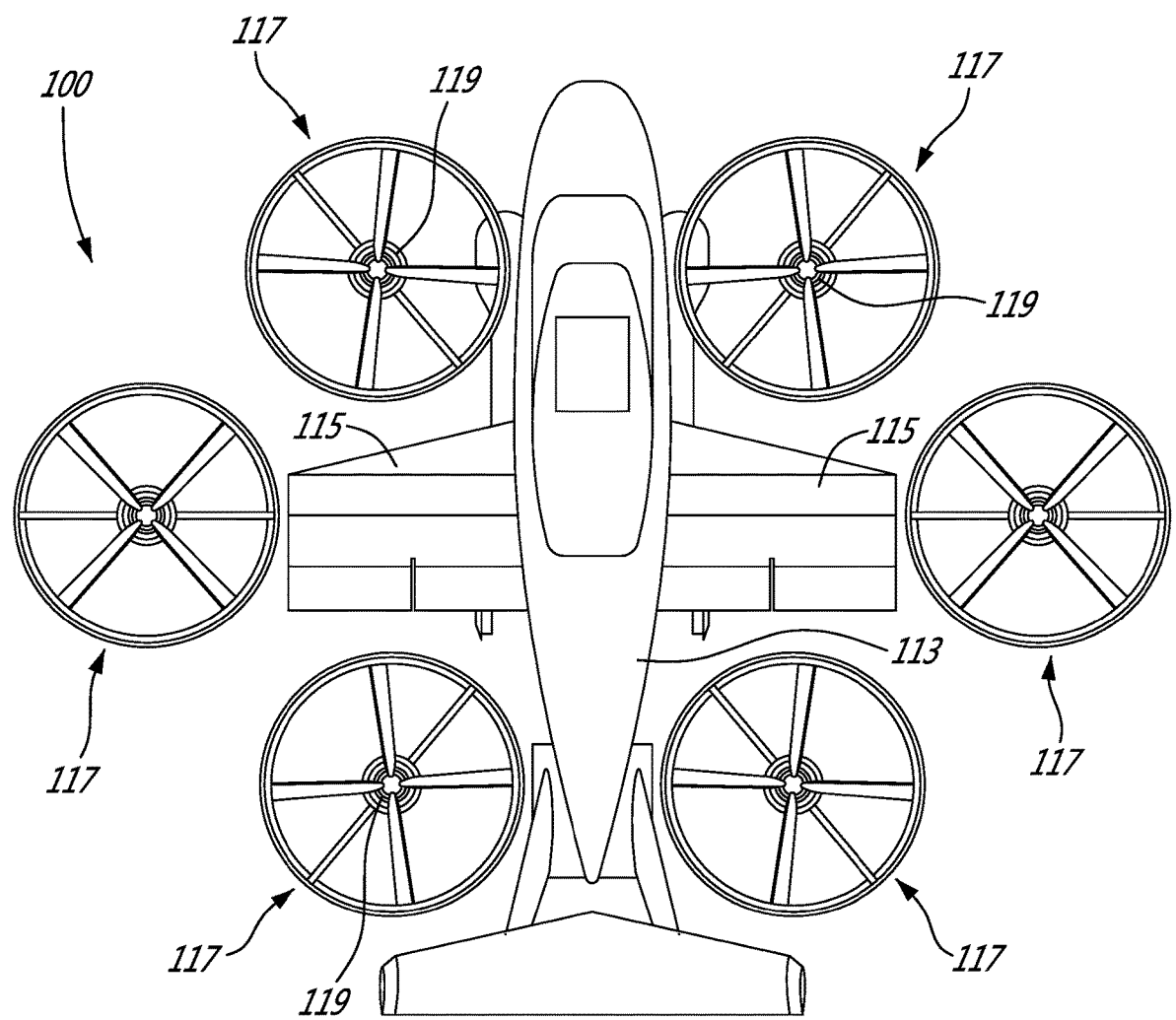

CONVERSION ACTUATION SYSTEMS AND METHODS FOR TILTROTOR AIRCRAFT

TECHNICAL FIELD

The application relates generally to tiltrotor aircraft and, more particularly, to actuation systems for tiltrotor aircraft.

BACKGROUND

Tiltrotor aircraft are hybrids between traditional helicopters and traditional propeller driven aircraft. Typical tiltrotor aircraft have rotor systems that are capable of articulating relative to the aircraft fuselage. This articulating portion is referred to as a pylon or nacelle. Tiltrotor aircraft are capable of converting from a hover mode, in which the aircraft can take-off, hover, and land like a helicopter; to an aircraft mode, in which the aircraft can fly forward like a fixed-wing airplane.

The design of tiltrotor aircraft poses unique problems not associated with either helicopters or propeller driven aircraft. In particular, the tiltrotor assemblies must be articulated between hover mode and aircraft mode. To convert between the hover mode and aircraft mode, the pylon must rotate relative to the fuselage.

Some tiltrotor aircraft use linear actuators, such as screw jacks or hydraulic jacks, to rotate the pylon about a rotation point relative to the fuselage. The actuation mechanism may experience undesirable effects when the pylons are oriented into the aircraft mode.

SUMMARY

There is provided a method for reducing mechanical backlash on a rod of an actuator, the rod drivingly connected to a spindle for displacing rotors of an aircraft between a hover mode and a flight mode, the method comprising: displacing the rod to displace a component with the spindle until the component abuts against a downstop of the aircraft and applies a load against the downstop; and passively maintaining the component against the downstop to maintain the load applied against the downstop.

There is provided a method of displacing rotors of an aircraft between a hover mode and an aircraft mode, the method comprising: rotating a spindle drivingly connected to the rotors about a spindle axis to displace the rotors between the hover and aircraft modes until a component displaceable with the spindle abuts against a downstop of the aircraft and applies a load against the downstop; and passively maintaining the component against the downstop to maintain the load applied against the downstop.

There is provided an aircraft, comprising: rotor ducts each having a rotor, the rotor ducts and the rotors being displaceable between a hover mode and an aircraft mode; a spindle drivingly connected to one of the rotor ducts and rotatable about a spindle axis to displace the rotor duct between the hover and aircraft modes; a downstop fixedly mounted within the aircraft and defining a contact surface; a linking member mountable to the spindle and displaceable therewith about the spindle axis toward and away from the contact surface of the downstop; and an actuator with a rod displaceable by a drive mechanism, the rod mounted to the linking member such that displacement of the rod causes the spindle to rotate about the spindle axis, the actuator having a passive friction device engaged with the rod to stop displacement thereof, the drive mechanism operable to displace the rod to abut the linking member against the contact surface and to apply a load with the linking member against the downstop, the drive mechanism disengageable from the rod upon the load being applied against the downstop, the passive friction device passively engaging the rod and stopping displacement thereof upon the load being applied against the downstop.

DESCRIPTION OF THE DRAWINGS

Reference is now made to the accompanying figures in which:

FIG. 2 is an enlarged cutaway view of the pylon-conversion actuation system of FIG. 1C;

FIG. 3 is schematic view of the pylon-conversion actuation system of FIG. 1C;

FIG. 5 is a perspective view of another aircraft in hover mode.

DETAILED DESCRIPTION

Figure 1A:
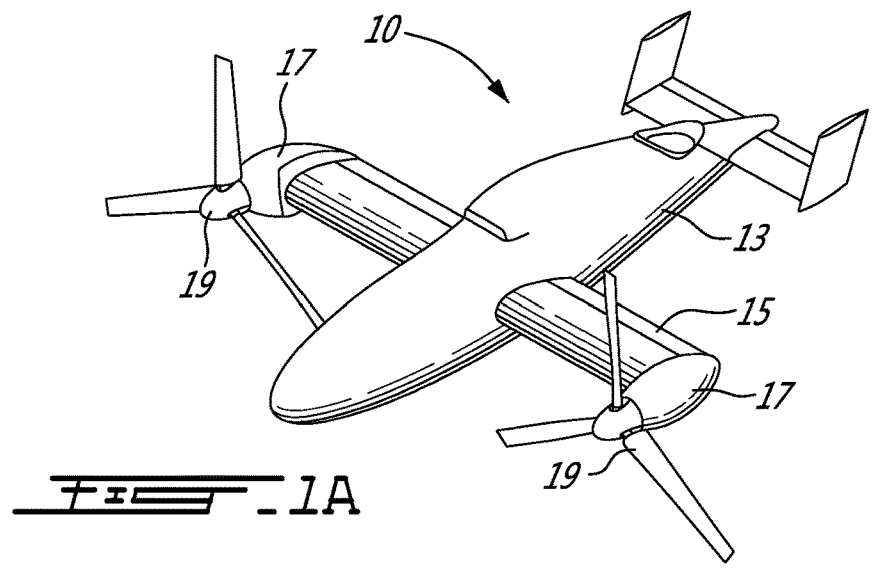
FIG. 1A is a perspective view of an aircraft in an aircraft mode.
Figure 1B:
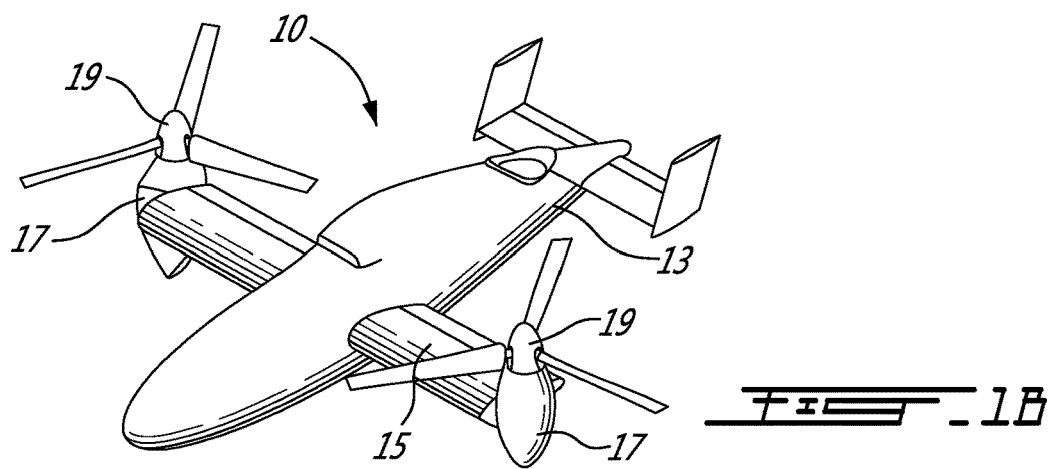
FIG. 1B is a perspective view of the aircraft of FIG. 1A in a hover mode.
Figure 1C:
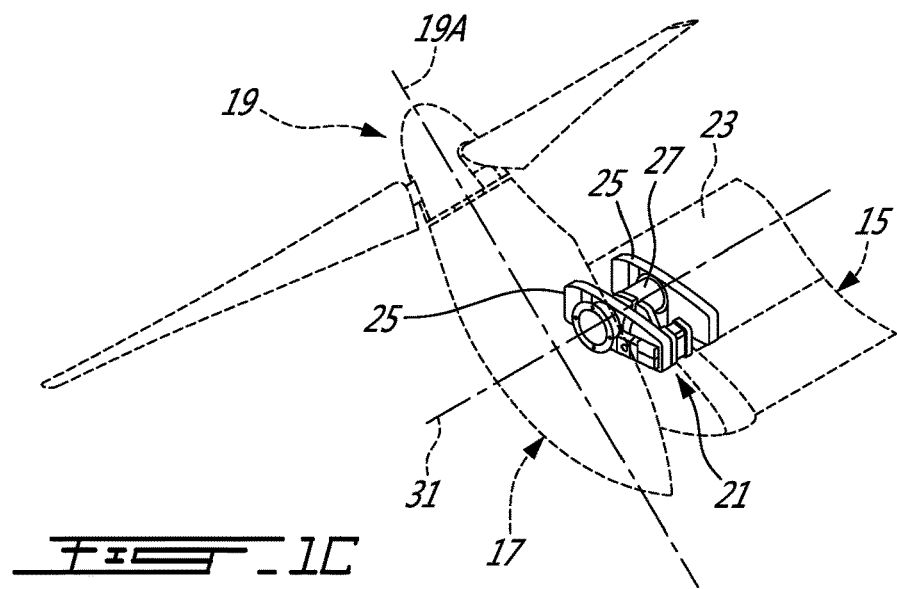
FIG. 1C is a partial cutaway view of the end of a wing of the aircraft of FIG. 1A showing a pylon-conversion actuation system.

Referring to FIG. 1A, a tiltrotor aircraft 10 is shown in aircraft mode. The aircraft 10 in FIG. 1A is an unmanned aerial vehicle (UAV), and therefore has no provision for onboard human pilots. The aircraft 10 is not limited to UAVs and may be a manned aircraft 10 as well. The aircraft 10 has a fuselage 13 with wings 15 extending from the fuselage 13. At the ends of wings 15 are rotor ducts 17, which rotate on the ends of wings 15 through a range of from about 90° of rotation up to about 100° of rotation. The rotor ducts 17 are sometimes referred to as pylons or nacelles. The rotor ducts 17 provide a rotatable support for rotors 19, and the engine used to power rotors 19 may be located within the fuselage or the corresponding rotor duct 17. When configured in the aircraft mode, the rotors 19 rotate in a vertical plane to drive the aircraft 10 forward as in a conventional propeller-driven aircraft. Each rotor duct 17 is generally horizontal, as shown in FIG. 1A. While the aircraft 10 is shown with rotor ducts 17 located at the ends of wings 15, other configurations may be used, such as a configuration in which the rotor ducts 17 are rotatably connected to the fuselage. In the aircraft mode, the rotor ducts 17 and rotors 19 can be converted or pivoted to position the rotors 19 in essentially a horizontal plane, where they can act as a helicopter rotor and the aircraft 10 operated as a helicopter for vertical takeoff and landing, as shown in FIG. 1B. The tiltrotor aircraft 10 is shown in a hover mode in FIG. 1B. In the hover mode, the plane of each rotor 19 is generally horizontal and each rotor duct 17 is generally vertical. The aircraft 10 may be different from the configuration shown. Another possible embodiment of the aircraft 100 is shown in FIG. 5. The aircraft 110 is a manned aircraft, and has a fuselage 113 with wings 115 extending from the fuselage 113. Rotor ducts 117 are arrange around the fuselage 113 and the wings 115, and rotate relative to the fuselage 113 from about 90° of rotation up to about 100° of rotation. The rotor ducts 117 each have rotors 119 which may be "ducted", and which are rotatable with the rotor ducts 117. Other configurations for the aircraft 10,110 are also possible.

Referring to FIG. 10, the end of one of the wings 15 is shown in partial cutaway view. The wing 15 is shown with a pylon-conversion actuation system 21 exposed, and the rotor duct 17 and corresponding rotor 19 are shown in phantom lines. The rotor duct 17 in FIG. 10 is in a conversion mode, in other words, between the hover mode and the aircraft mode. The wing 15 structurally includes a skin 23 and structural ribs 25. The pylon-conversion actuation system 21 includes a spindle 27 extending from the end of the wing 15 through two ribs 25. Where the spindle 27 passes through the ribs 25, bearing housings 29 support the spindle 27 and allow for rotation of the spindle 27 about a spindle axis 31 (see FIG. 2). The spindle axis 31 is transverse to the axis of rotation 19A of the corresponding rotor 19, as shown in FIG. 10. The spindle axis 31 may intersect the axis of rotation 19A of the rotors 19.

Referring to FIG. 10, the spindle 27 is in the form of a spindle duct which is a hollow cylindrical body extending along the spindle axis 31. The spindle 27 is drivingly connected to the corresponding rotor duct 17 so that rotation of the spindle 27 about the spindle axis 31 causes the rotor duct 17 to displace between the hover and aircraft modes. The connection between the spindle 27 and the rotor duct 17 may take different forms. In one possible configuration, and as shown in FIG. 2, the spindle 27 has a distal spindle flange 27A which is fastened to structure on the rotor duct 17. The structure of the rotor duct 17 therefore also rotates about the spindle axis 31, and through appropriate gearing in the rotor duct 17, the rotational motion of the structure about the spindle axis 31 is converted into rotational motion of the rotor duct 17 between the hover and aircraft modes. In FIG. 10, the rotor duct 17 is drivingly connected to a single spindle 27. In an alternate embodiment, a single spindle 27 is mechanically linked to multiple rotor ducts 17, such that rotation of the spindle 27 drives displacement of the rotor ducts 17 between the hover and aircraft modes.

Referring to FIG. 2, the pylon-conversion actuation system 21 includes a linking member 33. The linking member 33 is mechanically connected to the spindle 27 and is displaceable with the spindle 27 about the spindle axis 31. The linking member 33 transmits a drive from an actuator 39 of the pylon-conversion actuation system 21 to the spindle 27, so as to rotate the spindle 27 and drive the rotor duct 17. Many possible configurations of the linking member 22 are possible and within the scope of the present disclosure.

One possible configuration of the linking member 33 is shown in FIG. 2. The linking member 33 is an assembly of components, and includes a spindle arm 27B that is mounted to the duct of the spindle 27 and rotatable about the spindle axis 31. The spindle arm 27B extends radially outwardly from an outer surface of the duct of the spindle 27, and from the spindle axis 31. The linking member 33 also includes a nut 39A of the actuator 39. The nut 39A is connected to a distal end of the spindle arm 27B that is spaced radially outwardly from the duct of the spindle 27. The nut of 39A is displaced by the actuator 39, as explained in greater detail below, and thereby displaces the spindle arm 27B and the spindle 27 about the spindle axis 31. In another possible configuration, the linking member 33 includes only the nut 39A of the actuator 39.

Referring to FIG. 2, the actuator 39 of the pylon-conversion actuation system 21 includes a rod 39B mounted to the linking member 33, for example via the nut 39A. The rod 39B is displaceable by a drive mechanism 39C of the actuator 39. The drive mechanism 39C drives the rod 39 in order to effect displacement of the linking member 33 and the spindle 27 about the spindle axis 31.

Many configurations of the drive mechanism 39C and of the rod 39B are possible. For example, in FIG. 2, the drive mechanism 39C is a motor 39C' powered by electricity. In an alternate embodiment, the actuator 39 is a hydraulic actuator, and the drive mechanism 39C includes a piston and fluid chamber fillable with hydraulic fluid. The actuator 39 in FIG. 2 is a linear actuator. In operation, the drive mechanism 39C drives the rod 39B to linearly displace along a direction D1 parallel to a rod axis 39B' between an extended position and a retracted position. This linear displacement of the rod 39B is converted into rotational displacement of spindle 27 about the spindle axis 31 via the linking member 33, causing the rotor duct 17 to rotate between the hover and aircraft modes.

In FIG. 2, the actuator 39 includes a ball screw actuator 35. The ball screw actuator includes the nut 39A previously described, which has internal threads, and the rod 39B is a screw 35A with external threads. A plurality of spherical balls are captured between the threads of the nut 39A and the threads of the screw 35A. In the particular configuration shown, the motor 39C' drives rotation of the screw 35A about the rod axis 39B', and the balls help the nut 39A to resist a similar rotational movement. This relative movement between the screw 35A and the nut 39A causes the nut 39A to move axially relative to the screw 35A along the rod axis 39B', and thereby cause movement of the linking member 33 and the spindle 27. It will be appreciated that the ball screw actuator 35 may cause the opposite relative movement, e.g., where the nut 39A rotates about the rod axis 39B', while the screw 35A resists a similar rotation, to cause the screw 35A to move axially through the nut 39A. Reference is made to U.S. Pat. No. 5,092,539 for additional details about the ball screw actuator 35, and the entirety of U.S. Pat. No. 5,092,539 is incorporated by reference herein. A housing of the ball screw actuator 35 is pivotably mounted to the aircraft 10. For example, and as shown in FIG. 2, the ball screw actuator 35 is mounted to the rib 25 at a pivot 35B. This allows the ball screw actuator 35, and the nut 39A and the screw 35A, to pivot about a pivot axis 35B' defined by the pivot 35B to change the orientation of the screw 35A as the spindle 27 rotates about the spindle axis 31.

The actuator 39 has a passive friction device 37 which engages with the rod 39B. The passive friction device 37 is in frictional contact with the rod 39B, and slows or stops displacement of the rod 39B, and thus stops displacement of the linking member 33, the spindle 27, and the rotor duct 17. In FIG. 2, the passive friction device 37 is continuously engaged with the rod 39B and is thus always in frictional engagement with the rod 39B. To overcome the frictional engagement of the passive friction device 37, in FIG. 2 the motor 39C' is sized to provide a torque output which can exceed the frictional torque engagement of the passive friction device 37 with the rod 39B. The excess torque provided by the motor 39C' allows for displacement of the rod 39B, and thus allows for the rod 39B to drive displacement of the linking member 33, the spindle 27, and the rotor duct 17. The passive friction device 37 is passively engaged with the rod 39B in order to passively maintain its position when the motor 39C' does not apply the excess torque. This means that the passive friction device 37 does not require energy or activation to engage the rod 39B. The passive friction device 37 operates differently from "active" devices, such as brakes, which are activated or provided with energy to frictionally engage or lock onto another component. Such active devices are additional components which may need to be provided to an existing actuator, and may require additional monitoring equipment, such as load sensors. In an embodiment, the actuator 39 is free of active devices, such as brakes. In an embodiment, the rod 39B is free of active devices, such as brakes, for engaging the rod 39B.

One example of the passive friction device 37 is shown in FIG. 2. The passive friction device 37 includes a no-back 37A mounted about the rod 39B. The no-back 37A in FIG. 2 is in continuous frictional engagement with the rod 39B. The no-back 37A is a friction-based device that ensures that when movement of the rod 39B ceases, such as by removing current from the motor 39C', the no-back 37A holds or maintains the position of the rod 39B. The no-back 37A is a passive device, in contrast to a brake which is active because it actively engages/clamps the component whose movement it is desired to stop. The no-back 37A in FIG. 2 is a screwed-roller no-back 37A. The screwed-roller no-back 37A includes a friction plate with a series of rollers that provides a constant level of friction against the rod 39B. The no-back 37A allows for maintaining the rod 39B stationary at a specific position of the rod 39B.

In one possible configuration, the no-back 37A operates bi-directionally, such that it operates to prevent rotation of the rod 39B about the rod axis 39B' in both the direction of rotation R1 and the opposite direction of rotation R2 when the motor 39C' is inactive or when the motor 39C' is producing an output torque less than the frictional torque engagement of the no-back 37A with the rod 39B. For example, referring to FIG. 2, when the torque output of the motor 39C' in the direction of rotation R1 exceeds the frictional torque engagement of the no-back 37A with the rod 39B, the no-back 37A allows the screw 35A to rotate in the direction of rotation R1 about the rod axis 39B' to drive the nut 39A in the direction D1, and thereby cause the spindle 27 and the linking member 33 to rotate about the spindle axis 31. Similarly, when the torque output of the motor 39C' in the direction of rotation R2 exceeds the frictional torque engagement of the no-back 37A with the rod 39B, the no-back 37A allows the screw 35A to rotate in the direction of rotation R2 about the rod axis 39B' to drive the nut 39A in a direction opposite to the direction D1, and thereby cause the spindle 27 and the linking member 33 to rotate about the spindle axis 31 in an opposite direction.

However, if the motor 39C' is inactive or is producing an output torque less than the frictional torque engagement of the no-back 37A with the rod 39B, the continuous frictional engagement of the passive no-back 37A will prevent or stop the rotation of the screw 35A about the axis 39B' in both directions of rotation R1,R2, and thus stop linear displacement of the screw 35A. The no-back 37A is a component of the actuator 39, and thus the actuator 39 is able to stop displacement of the rod 39B or hold it in position without the use of additional parts, such as a brake. The no-back 37A is able to hold the rod 39B in a stationary and desired position without having to continuously operate the motor 39C', and thus contributes to reducing the risk of overheating the motor 39C'. Reference is made to U.S. Pat. No. 6,109,415 for additional details about the no-back 37A, and the entirety of U.S. Pat. No. 6,109,415 is incorporated by reference herein. An alternate configuration of a no-back includes ratchet pawls that allow the friction elements to rotate with the screw under opposing load such that the motor does not need to be oversized. Other types of passive friction devices 37 may be used.

When the rotor ducts 17 tilt or are converted from the hover mode to the aircraft mode, the actuators 39 may experience mechanical backlash, particularly if the conversion occurs at higher forward flight speeds. An excessive amount of mechanical backlash may contribute to aero-servo-elastic coupling caused by aerodynamic and other loads resulting from the conversion of the rotor duct 17 from the hover mode to the flight mode, which in turn can lead to an undesired effect at the vehicle level.

To reduce or eliminate such mechanical backlash on the actuator 39, the drive mechanism 39C is operable to "preload" the rod 39B. Stated differently, the drive mechanism 39C is operable to displace the rod 39B to a position such that a load will be exerted on the rod 39B before it experiences mechanical backlash. This load is capable of countering or neutering the effects of mechanical backlash that may be experienced by the rod 39B.

Pre-loading the rod 39B may be achieved using different techniques. One possible technique is now described with reference to FIG. 3. The aircraft 10 has a downstop 40 fixedly mounted within the aircraft 10 in proximity to the linking member 33 and the actuator 39. The downstop 40 is a physical object which is fixedly attached at an appropriate location within the aircraft 10, and used to arrest or stop movement of a component which comes into contact with the downstop 40. In FIG. 3, the downstop 40 is schematically represented as a block. In an alternate embodiment, the downstop 40 is an arm fixedly mounted to one of the ribs 25 inwardly of the skin 23, and rendered immobile relative to the rib 25. Other configurations for the downstop 40 are possible.

Referring to FIG. 3, the downstop 40 is positioned along the path of movement of the linking member 33, such that the linking member 33 is displaceable toward and away from the downstop 40, depending on the direction of rotation of the spindle 27. The downstop 40 is positioned to block further displacement of the linking member 33, and thus further displacement of the spindle 27, when the linking member 33 abuts against a contact surface 42 defined by the downstop 40. The downstop 40 in FIG. 3 operates to block further movement of the linking member 33 in only one direction of movement of the linking member 33. It will be appreciated that additional downstops 40 may be provided to block further movement of the linking member 33 along all its directions of movement.

The downstop 40 in FIG. 3 is located at a position consistent with the rotors 19 and the rotor ducts 17 being in the aircraft mode. Stated differently, as the linking member 33 moves toward the downstop 40, the rotor duct 17 is converting from the hover mode to the aircraft mode. The drive mechanism 39C drives the rod 39B to displace the linking member 33 toward the downstop 40 in order to abut the linking member 33, or some component thereof, against the contact surface 42. The drive mechanism 39C continues to drive the rod 39B in this manner until the linking member 33 is exerting a force or load against the downstop 40. This force or load is maintained against the downstop 40, thereby pre-loading the rod 39B, which may help to reduce or eliminate the mechanical backlash that may be experienced by the rod 39B during conversion of the rotor ducts 17 from the hover mode to the aircraft mode. The load is applied once the spindle 27 has been rotated to displace the rotor ducts 17 and the rotors 19 from the hover mode to the aircraft mode. The load may also be applied after rotating the spindle 27 to displace the rotor ducts 17 and the rotors 19 from the aircraft mode to the hover mode, if desired.

There may be a need or desire to maintain pre-loading on the rod 39B throughout the duration of the rotor ducts 17 being in the aircraft mode, in order to prevent the rotor ducts 17 from beginning to convert to hover mode during forward flight of the aircraft 10. When the desired load is applied against the downstop 40, the drive mechanism 39C is disengaged from the rod 39B. The drive mechanism 39C is temporarily made inoperative or ineffective at displacing the rod 39B. The disengagement of the drive mechanism 39C from the rod 39B may take different configurations. In one possible configuration, the drive mechanism 39C is deactivated. In one possible configuration, the motor 39C' of the drive mechanism 39C is turned off. In one possible configuration, the drive mechanism 39C is maintained activated, and the gearing that connects the drive mechanism 39C to the rod 39B is configured such that the output of the drive mechanism 39C does not cause the rod 39B to displace. Other configurations are also possible.

It will thus be appreciated that when the rod 39B is sufficiently and initially preloaded, the drive mechanism 39C is temporarily disengaged from the rod 39B. When this occurs, the frictional engagement of the passive friction device 37 with the rod 39B stops displacement of the rod 39B. The pre-load on the rod 39B is thus maintained by the passive friction device 37 (e.g. the no-back 37A) of the actuator 39, to thereby reduce or prevent the effects of mechanical backlash. In contrast, some conventional systems use dedicated and active electro-mechanical brakes to maintain the actuator at the desired position. The actuator 39 does not require a dedicated brake or active device, which may help to reduce weight and cost. Furthermore, mechanical brakes are an additional component which may require sensors to detect the level of pre-load required. The actuator 39 is able to pre-load the rod 39B and maintain the pre-load using a passive device, such as the no-back 37A, which is a component inherent to the actuator 39, and thus obviates the need to provide additional components.

The pylon-conversion actuation system 21 may include suitable electronics for controlling the actuator 39 and monitoring displacement of components of the pylon-conversion actuation system 21. Referring to FIG. 3, a controller 50 communicates with the drive mechanism 39C to command the drive mechanism 39C to perform its various functions. For instance, the controller 50 commands the drive mechanism 39C to displace the rod 39B. The position of the rod 39B is related to the position of the linking member 33 that is displaced by the rod 39B. The controller 50 may command the drive mechanism 39C to displace the rod 39B (and thus the linking member 33) to a position which will result in the rod 39B being preloaded when the linking member 33 abuts against the contact surface 42 of the downstop 40. The controller 50 may set this preloading position to correspond to a physical location of the linking member 33 that is past the known location of the contact surface 42 of the downstop 40. For example, and as shown in FIG. 3, the controller 50 may command the drive mechanism 39C to drive the rod 39B to displace the linking member 33 to a distance Δ past the location of the contact surface 42 of the downstop 40. The distance Δ is spaced inwardly from the contact surface 42 into the body of the downstop 40. Therefore, as the linking member 33 is displaced toward the contact surface 42 when converting from hover mode to aircraft mode, the linking member 33 travels and closes the distance X shown. The controller 50 may command the drive mechanism 39C to continue displacing the rod 39B to a position that corresponds to the linking member 33 being at the contact surface 42 plus the distance Δ. This helps to ensure that the linking member 33 applies a load against the downstop 40, so that the rod 39B is preloaded. The controller 50 in FIG. 3 is part of the actuator 39, and may be or include Motor Control Electronics (MCE) 52. In an embodiment, the controller 50 is part of, or controlled by, the flight control computer (FCC) 54.

In FIG. 3, the controller 50 communicates with the drive mechanism 39C to command the drive mechanism 39C to regulate a speed of displacement of the rod 39B. For example, when the distance separating the linking member 33 from the contact surface 42 of the downstop 40 is less than the threshold distance X, the controller 50 communicates with the drive mechanism 39C to command the drive mechanism 39C to reduce the speed of displacement of the rod 39B to reduce the speed of impact of the linking member 33 against the contact surface 42.

The pylon-conversion actuation system 21 may include suitable sensors for monitoring displacement of components of the pylon-conversion actuation system 21. Referring to FIG. 3, a rod position sensor 56 outputs signals indicative of a position of the rod 39B of the actuator 39, and a spindle position sensor 58 outputs a spindle position signal indicative of a position of the spindle 27. In embodiments where the spindle 27 is a cylindrical duct, the displacement of the spindle 27 is measured in degrees, and thus the spindle position signal may be a degree value. In FIG. 3, the spindle 27 has teeth 33A which mesh with teeth of the spindle position sensor 58 to determine the position of the spindle 27. The teeth 33A are mounted about an outer surface of the duct of the spindle 27 and rotatable with the spindle 27 about the spindle axis 31. The teeth 33A may be spaced apart from the spindle arm 27B in a direction parallel to the spindle axis 31. The spindle arm 27B protrudes radially outwardly from the outer surface of the duct of the spindle 27 more than the teeth 33A. Other position sensors are possible.

It will be appreciated that the rod and spindle position sensors 56,58 do not need to be in direct mechanical engagement with the rod 39B and the spindle 27, respectively, and that the rod and spindle position sensors 56,58 may include any suitable monitor which is capable of directly measuring, or deriving, the position of the rod 39B and spindle 27. For example, one or both of the rod and spindle position sensors 56,58 may include a monitor on the motor 39C' of the drive mechanism 39C, which monitors the rotation of the motor 39C' to approximate the position of the rod 39B and/or spindle 27 based on the known geometric relationships between the components of the pylon-conversion actuation system 21. Another example involves using variations in the electric current of the motor 39C' to approximate the position of the rod 39B and/or spindle 27.

The controller 50 may communicate with one or both of the rod and spindle position sensors 56,58 to receive their output signals. Still referring to FIG. 3, when the load applied against the downstop 40 by the linking member 33 is sufficient, the rod position sensor 56 may record the position of the rod 39B, and output a reference position signal to the controller 50 that is indicative of a reference position of the rod 39B. The pylon-conversion actuation system 21 and/or the controller 50 are operable to compare the reference position signal to other rod positions signals, in order to determine whether the rod 39B has deviated or moved from the reference position. This may help to determine if the rod 39B is still sufficiently preloaded to prevent or reduce the effects of mechanical backlash, as explained in greater detail below.

The spindle and rod position sensors 58,56 may be deactivated by the controller 50 when the desired load is applied against the downstop 40 by the linking member 33. This may be done to prevent tripping the spindle and rod position sensors 58,56, which most of the time may be configured to output warning signals when the positions of the rod 39B and the spindle 27 are outside normal parameters or limits. For example, in the embodiment where the controller 50 commands the drive mechanism 39C to drive the rod 39B to displace the linking member 33 to the distance Δ past the location of the contact surface 42 of the downstop 40, as explained above, the spindle and rod position sensors 58,56 may normally be configured to output a warning signal alerting the controller 50 of impermissible or undesirable displacements of the rod 39B or the spindle 27. Since this displacement of the linking member 33 past the contact surface 42 is desirable in this situation, the spindle and rod position sensors 58,56 may be deactivated to prevent them from outputting false or irrelevant warning signals.

It can be appreciated that the pylon-conversion actuation system 21 helps to provide a pre-load on the rod 39B, and to maintain the pre-load using a component that is part of the actuator 39, such as the no-back 37A. The pylon-conversion actuation system 21 also allows for monitoring the displacement of the rod 39B, to ensure that the pre-load is applied when needed, and to detect if movement of the rod 39B has occurred, which might indicate that the rotor duct 17 is not oriented as it should be.

Referring to FIG. 3, there is disclosed a method for loading the downstop 40 of the aircraft 40 when displacing the rotors 19 between the hover and aircraft modes. There is disclosed a method of displacing the rotors 19 between the hover and aircraft modes. The method includes rotating the spindle 27 about the spindle axis 31 to displace the rotors 19 between the hover and aircraft modes until a component (e.g. one or more of the linking member 33, the nut 39A, and the spindle arm 27B) displaceable with the spindle 27 abuts against the downstop 40 and applies a load against the downstop 40. The method includes passively maintaining the component against the downstop 40 to maintain the load applied against the downstop 40. The method disclosed herein may be considered a method for rotor duct conversion with downstop 40 pre-loading.

Figure 4:
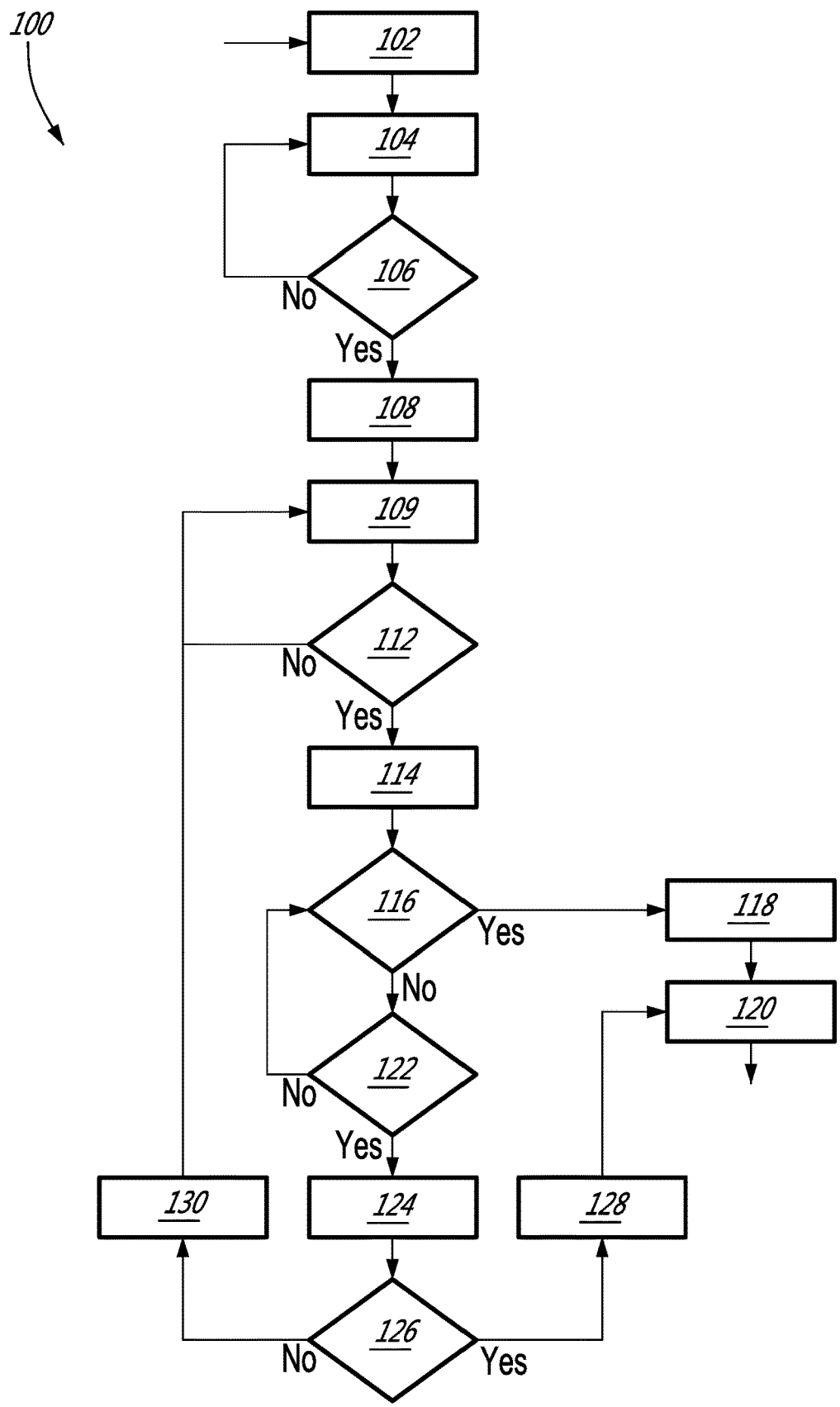
FIG. 4 is a flow chart of displacing rotors of an aircraft between a hover mode and an aircraft mode.

FIG. 4 shows an example of the logic 100 that may be applied when performing the disclosed methods. At process point 102, the rotor ducts 17 are commanded, by the FCC 54, pilot or other authority, to begin converting from the hover mode to the aircraft mode. This leads to process point 104, where the pylon-conversion actuation system 21 is operated to achieve the desired conversion. The actuator 39 and the drive mechanism 39C are activated to displace the rod 39B in order to rotate the spindle. The drive mechanism 39C is commanded to displace the rod 39B to thereby displace the component to a position past a position of the downstop 40, such as by commanding the rod 39B to displace to a position corresponding to the position of the downstop 40 plus the distance Δ past the location of the contact surface 42 of the downstop 40. This helps to ensure that the component contacts the downstop 40. Any position command may be given in terms of a physical location, a translational distance to displace, or degree values of the duct of the spindle 27. At decision node 106, if the position of the component from the contact surface 42 is greater than the distance X (the "No" option at decision node 106), the drive mechanism 39C continues to drive the rod 39B to displace the component toward the contact surface 42. When the distance separating the component from the contact surface 42 of the downstop 40 is less than the distance X (the "Yes" option at decision node 106), the process point 108 is reached, and the controller 50 communicates with the drive mechanism 39C to command the drive mechanism 39C to reduce the speed of the component displacing toward the contact surface 42 to reduce an impact velocity of the component.

Reducing the speed of the component against the contact surface 42 may help to achieve a consistent application of pre-load against the downstop 40. In the embodiment where the actuator 39 is a linear actuator with an electromechanical ball screw with MCE 52, reducing the speed of the rod 39B to reduce the impact velocity of the component may involve the FCC 54 or other suitable authority issuing a command for the MCE 52 to reduce its internal current limiter to a predefined value Y which corresponds to the desired downstop pre-load value. Commanding the actuator 39 to reduce the speed of displacement of the rod 39B may also including commanding the actuator 39 to reduce a speed of rotation (RPM) of the rod 39B about the rod axis 39B'. The speed of displacement of the rod 39B may be correlated with the output speed of the motor 39C' in the embodiment where the actuator 39 contains a motor 39C'.

At the process point 108, position sensors (e.g. the spindle and rod position sensors 58,56) are disabled by the controller 50 when the desired load is applied against the downstop 40 by the component. This may be done to prevent tripping the spindle and rod position sensors 58,56, as explained above. Inhibiting such velocity and position continuous monitors may help to prevent nuisance trips during the pre-load operation.

Thus, at process point 109, the rod 39B is displacing at a lower speed to reduce the impact velocity of the component. The decision node 112 allows for the rod 39B to continue displacing at this lower speed (the "No" option at decision node 112) until the component abuts against the contact surface 42 to apply the preload, and thus stops further displacement of the rod 39B. When the speed of displacement of the rod 39B is zero for a specified threshold time period, a "yes" response is triggered at the decision node 112. When contact with the downstop 40 is made, the actuator 39 is loaded, velocity drops, and the MCE 52 may respond by drawing more current to meet the velocity demand and increase torque applied by the motor 39C'. In an alternate embodiment, the displacement of the rod 39B is stopped when the distance separating the component from the downstop 40 has been less than the threshold distance X for a period of time.

In an embodiment, stopping further displacement of the rod 39B may be achieved by simply deactivating the motor 39C'. The FCC 54 may disengage the motor 39C' when its absolute velocity, which may correspond to the speed of displacement of the rod 39B, is reported to be below a small threshold for a persistent time period. Alternatively, the disengagement of the motor 39C' may simply take place following a set time after distance X has been reached. The motor 39C' may be disengaged when the MCE 52 current saturates to a value Y, and the motor 39C' stops as a result. When the motor 39C' is deactivated, the frictional engagement of the passive friction device 37 with the rod 39B maintains the position of the rod 39B. This allows the motor 39C' to avoid having to continuously operate to maintain the pre-load on the downstop 40, and thus may help to avoid overheating of the motor 39C' or burnout. Thus passively maintaining the component against the downstop 40 includes stopping a displacement of the rod 39B, such as by stopping a rotation of the rod 39B about the rod axis 39B'.

After the actuator 39 has been disengaged from the rod 39B or deactivated, and the displacement of the rod 39B for preloading has ceased, the controller 50 waits for a second time period and records a reference position of the stopped rod 39B at process point 114. In the embodiment where the actuator 39 has the motor 39C', it may occur that the motor 39C' and/or the rod 39B "spring back" to some position after the motor 39C' has been disengaged, due to the energy stored in the gear train of the motor 39C'. The rod 39B will become stationary again after the second time period, and its position is then recorded as the reference position. From that point on, the passive friction device 37 is maintaining the downstop pre-load value. The FCC 54 may store this position of the motor 39C' as the reference position corresponding to the nominal pre-load, and the continuous monitors of the pylon-conversion actuation system 21 may be reactivated to detect any creep or movement from the reference position. The reference position may help to determine if there is any creep or motion following disengagement of the motor 39C', because it may occur that high vibrations cause the no-back 37A, for example, to slowly let go of the screw 35A such that the preload is reduced. These vibrations may cause the screw 35A to rotate in direction of rotation R2 described above.

At decision node 116 in FIG. 4, the FCC 54, pilot or other authority may command the rotor ducts 17 to convert from the aircraft mode to the hover mode. If this occurs (represented by a "yes" leading from the decision node 116), the actuator 39 is reengaged with the rod 39B at process point 118. At process point 118, current saturation limits previously imposed by the MCE 52 may be removed. The actuator 39 is thus able to displace the rod 39B and rotate the spindle 27 about the spindle axis 31 to move the rotors 19 into the hover mode, as shown in process point 120.

At decision node 116, when no command is given to the rotor ducts 17 to convert from the aircraft mode to the hover mode (represented by a "no" leading from the decision node 116), the logic 100 arrives at decision node 122, which governs the outcome from monitoring displacement of the rod 39B relative to the reference position. It may occur that vibration or other loads acting on the actuator 39 affect the frictional engagement of the no-back 37A, for example, with the rod 39B, and cause the screw 35A to slowly backdrive in direction of rotation R2 described above such that the pre-load value is proportionally reduced. This may be detected, in one possible configuration, when the position of the motor 39C' deviates at a slow rate from the corresponding reference position by a given threshold. If no deviation of the rod 39B has occurred from the reference position or the deviation is less than the threshold (represented by a "no" leading from the decision node 122), the logic 100 arrives back at the decision node 116, to repeat the cycle described above.

If, however, deviation of the rod 39B has occurred from the reference position beyond the threshold value (represented by a "yes" leading from the decision node 122), the process point 124 is reached, and the actuator 39 is reengaged with the rod 39B to displace the rod 39B to maintain the pre-load value. Under these conditions, the motor 39C' is re-engaged, the creep monitors reset, and the pre-load sequence of the logic 100 is re-executed. The method disclosed herein therefore helps to ensure that the pre-load remains present under different levels of vibration, including severe levels. The use of the passive friction device 37 is thus combined in some embodiments with motor 39C'/rod 39B creep detection, and pre-load re-activation. The method may therefore allow for reducing the downstop 40 impact velocity, ensuring a consistent level of pre-load, and ensuring that the pre-load remains present even under severe levels of vibration.

Once the actuator 39 is reengaged, the logic 100 arrives at decision node 126. It may occur that the rod 39B deviates from its reference position because of a failure of the passive friction device 37. For example, if the no-back 37A fails in a way where irreversibility is completely lost, such as the pawls of the no-back 37A breaking, the screw 35A may rapidly backdrive. This will be detected when the position of the motor 39C' deviates at high rate from the reference position by a given threshold. Under these conditions (represented by a "yes" leading from the decision node 126), the motor 39C' is re-engaged to maintain the position of the rod 39B, the no-back 37A failure is communicated at process point 128, and the rotor duct 17 is controlled by the FCC 54. Stated differently, if the no-back 37A fails, the motor 39C' reengages the rod 39B and may stay reengaged until the aircraft 10 has landed. If the deviation of the rod 39B is not due to a failure of the passive friction device 37 (represented by a "no" leading from the decision node 126), the deviation of the rod 39B and the loss or reduction of the pre-load is communicated at the process point 130, and the logic returns to process point 109 in order to displace the rod 39B at lower speed toward the contact surface 42 of the downstop 40.

Other features of the pylon-conversion actuation system 21 disclosed herein may be found in U.S. Pat. No. 7,913,947, the entirety of which is incorporated by reference herein.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:
1. An aircraft, comprising:
rotor ducts each having a rotor, the rotor ducts and the rotors being displaceable between a hover mode and an aircraft mode;
a spindle drivingly connected to one of the rotor ducts and rotatable about a spindle axis to displace the rotor duct between the hover and aircraft modes;
a downstop fixedly mounted within the aircraft and defining a contact surface;
a linking member mountable to the spindle and displaceable therewith about the spindle axis toward and away from the contact surface of the downstop; and
an actuator with a rod displaceable by a drive mechanism, the rod mounted to the linking member such that displacement of the rod causes the spindle to rotate about the spindle axis, the actuator having a passive friction device engaged with the rod to stop displacement thereof, the drive mechanism operable to displace the rod to abut the linking member against the contact surface and to apply a load with the linking member against the downstop, the drive mechanism disengageable from the rod upon the load being applied against the downstop, the passive friction device passively engaging the rod and stopping displacement thereof upon the load being applied against the downstop.

2. The aircraft of claim 1, wherein the drive mechanism is deactivated upon the load being applied against the downstop.

3. The aircraft of claim 1, wherein the passive friction device includes a no-back mounted about the rod.

4. The aircraft of claim 1, comprising a spindle position sensor operable to output a spindle position signal indicative of a position of the spindle, and a rod position sensor operable to output a rod position signal indicative of a position of the rod of the actuator, the spindle and rod position sensors deactivating upon the load being applied against the downstop.

5. The aircraft of claim 1, comprising a rod position sensor operable to output rod position signals indicative of a position of the rod of the actuator, the rod position signal upon the load being applied against the downstop being a reference position signal indicative of a reference position of the rod, the aircraft operable to compare the reference position signal to other rod positions signals to determine deviation of the rod from the reference position.

6. The aircraft of claim 1, wherein the actuator includes a ball screw actuator pivotably mounted to the aircraft.

7. The aircraft of claim 1, wherein the linking member includes a nut mounted about the rod and displaceable relative to the rod.

8. The aircraft of claim 1, wherein the linking member includes a nut mounted about the rod and displaceable relative to the rod, and a spindle arm mounted at a first end to the nut and at a second end to the spindle.

\* \* \* \* \*